United States Patent [19]

Hadermann et al.

[11] Patent Number: 4,917,834
[45] Date of Patent: Apr. 17, 1990

[54] METHOD FOR FORMING HOMOGENEOUS BLENDS OF PARTICULATE MATERIALS

[75] Inventors: Albert F. Hadermann, Ijamsville, Md.; Jerry C. Trippe, Fairfax Station, Va.

[73] Assignee: General Technology Applications, Inc., Manassas, Va.

[21] Appl. No.: 271,705

[22] Filed: Nov. 16, 1988

[51] Int. Cl.⁴ ............................................. B29B 9/02
[52] U.S. Cl. ........................................ 264/8; 241/23; 241/DIG. 37; 264/28; 264/140; 264/176.1; 523/309; 528/481
[58] Field of Search ............... 264/5, 28, 8, 140, 176.1; 241/2, 23, 31, DIG. 37; 523/309; 528/481

[56] References Cited

U.S. PATENT DOCUMENTS

| | | | |
|---|---|---|---|
| 2,735,624 | 2/1956 | Beck | 241/DIG. 37 |
| 2,836,368 | 5/1958 | McCoy | 241/DIG. 37 |
| 3,172,546 | 3/1965 | Schreiner | 241/23 |
| 3,692,759 | 9/1972 | Ocone | 528/481 |
| 3,992,350 | 11/1976 | Bensa et al. | 241/DIG. 37 |
| 4,474,905 | 10/1984 | Hadermann et al. | 523/309 X |
| 4,493,806 | 1/1985 | Hatzikelis et al. | 264/28 |

FOREIGN PATENT DOCUMENTS

| | | | |
|---|---|---|---|
| 762437 | 7/1967 | Canada. | |
| 55-45717 | 3/1980 | Japan | 264/28 |
| 61-53009 | 3/1986 | Japan | 264/28 |
| 1397793 | 6/1975 | United Kingdom | 241/23 |

OTHER PUBLICATIONS

Tekmar Company, "Select the Rotor-Stator Generator That's Right for Your Job", p. 23 (Mar. 1986).

*Primary Examiner*—Jeffery Thurlow
*Assistant Examiner*—Leo B. Tentoni
*Attorney, Agent, or Firm*—Roland H. Shubert

[57] ABSTRACT

A mixture of unlike particulate solids is dispersed in liquid nitrogen to form a slurry. The slurry is then subjected to shear and impact forces of sufficient intensity and duration to break up agglomerates, to comminute at least the larger particles, and to obtain a randomly mixed homogeneous suspension. The suspension is thereafter stabilized by removal of liquid nitrogen to form a past or powder which may be further processed into shapes by extrusion or molding. One preferred embodiment utilizes a batch-to-continuous process for the compounding of rubber with carbon black and other additives.

27 Claims, 3 Drawing Sheets

METHOD FOR FORMING HOMOGENEOUS BLENDS OF PARTICULATE MATERIALS

BACKGROUND OF THE INVENTION

1. Field of the Invention

This invention relates generally to the mixing of two or more unlike, solid particulate materials to form homogeneous blends thereof.

More particularly, this invention relates to a method for dispersing fine particles and fine particle agglomerates of unlike materials to form homogeneous mixtures and to thereafter stabilize the mixtures while maintaining their homogeneity. The stabilized mixtures may then be further processed by techniques such as molding, extrusion and reaction to form useful mixtures and composites.

2. Description of Related Art

Many industrial processes require the mixing or dispersion of finely divided particles of two or more unlike substances to obtain a homogeneous mixture or composite. Examples of such processes include the compounding of rubber, the manufacture of pigment and filler pastes for paints and plastics, and the production of ceramic composites, particularly those reinforced with fibers such as inorganic whiskers. In most cases, the properties of the resulting products are directly related to the homogeniety of the mix and the degree to which aggregates and agglomerates are broken down to their ultimate particles or to a mono-disperse form.

Finely divided solid particles tend to clump and to form agglomerates due to the interparticle attraction produced by a variety of molecular, electrical and surface effect forces. These attractive forces become increasingly significant as particle size decreases. At particle diameters of a few microns or less it can require accelerations of many times the force of gravity to separate adjacent particles.

Examples of particulate substances commonly used in industry include carbon black, pigments such as titanium oxide and zinc oxide, whiting, vulcanizing agents such as sulfur, salts such as ammonium nitrate and ammonium perchlorate, plastics such as polytetrafluoroethylene extrusion powders, and finely divided metals and metal oxides. These particulate substances typically have a particle size ranging downwardly from a few microns and seldom can be obtained or maintained in a mono-disperse form. Instead, reliance is placed upon physical working of the materials to obtain acceptable degrees of product homogeneity.

The dispersal or mixing of finely divided materials including fine particle agglomerates ordinarily requires far more involved techniques than simple blending or mixing in order to break down the agglomerates to ultimate particles and disperse them relatively uniformly throughout the mix. Mixing devices employing high velocity impellers and the like are not generally effective. It is usually necessary to employ equipment such as mixers with intermeshing blades or mixers having small clearances between the blades and the body to produce slow speed shear at a high level of mixing power input in order to obtain an intimate and uniform mix. Muller mixers, pug mills, kneaders and other intensive mixers such as Banbury mixers are commonly employed for these purposes.

These common approaches to obtaining homogeneous mixtures of fine particle agglomerates have many practical drawbacks. The work input necessary to obtain the desired degree of dispersion produces intense localized heating. That heating, especially when coupled with high physical shear, results in the degradation of rubbers and plastics with a significant reduction in the average molecular weight It can also result in the decomposition of heat sensitive materials such as certain salts, sometimes with catastrophic effect. Brittle reinforcing fibers cannot be effectively used as the shearing action substantially reduces the average aspect ratio of the fibers When the mix includes reactive components and catalysts, as is the case when compounding many filled rubber and plastics formulations, the localized heating can cause premature and nonuniform polymerization and other reactions. Further, processing is normally done on a batch basis because of the holdup time in the mixer itself makes continuous processing difficult or impossible.

It has been proposed in the prior art to compound certain types of materials at low temperatures using refrigerants such as carbon dioxide and cryogens such as liquid nitrogen. One such prior art technique is disclosed in commonly assigned U.S. Pat. No. 4,474,905 which sets out a process for mixing chemically reactive liquids with particulate solids to form a homogeneous blend. The liquid is chilled to a temperature below its solidification point and is formed into finely divided, solidly frozen particulates and the solid particulates are chilled to a temperature below the solidification temperature of the liquid The materials are then mixed together, without allowing the temperature to rise above the liquid solidification point, using conventional solid-solid or liquid-solid mixers.

Another approach to the low temperature processing of particulate mixtures is shown by Canadian Patent No. 762,437 That patient describes a method for preparing multi-component, spontaneously reactive, chemical formulations in a manner such that they can be maintained in a stable form for long periods of time until it is desired to permit the reaction to proceed. Typical of such formulations are any of a number of epoxy resins in which the resin and hardener are frozen and ground separately in a refrigerant. The two separate components are then intimately mixed in liquid nitrogen and can be stored in that state for an indefinite period of time without reaction. When the liquid nitrogen is permitted to evaporate and the components allowed to warm, melting and reaction occurs. In a system of the sort described in the Canadian patent, segregation of the components during storage in the liquid nitrogen can be avoided only if the specific gravities, or densities, of the various solid components are essentially the same.

An early French patent, No. 945,337 to Potau, describes a process for preparing rubber formulations at low temperatures.

Rubber is cooled until it becomes brittle, at about $-80°$ C., and is crushed to form a powder. The rubber powder is mixed with other ingredients and the mixture is heated under pressure to obtain a final product.

Yet another approach to the low temperature blending of particulate solids is described in copending, commonly assigned, U.S. patent application Ser. No. 790,374.

All of the above described processes have significant disadvantages when used for the preparation of homogeneous mixtures of finely divided particles of two or more unlike materials in which one or more of the materials comprises fine particle agglomerates.

SUMMARY OF THE INVENTION

Homogeneous mixtures of finely divided solids of two or more unlike materials including fine particle agglomerates such as carbon black, inorganic compounds, rubbers, plastics, vulcanizing agents and the like, are prepared by forming a slurry of the components of the mixture in liquid nitrogen. The slurry is then subjected to agitation and shear of sufficient intensity and duration to break up the agglomerates and to maintain the individual particles resulting from agglomerate break up and the particles of other materials in a randomly mixed homogeneous suspension. The homogeneous suspension is then stabilized by removing liquid nitrogen therefrom and the stabilized mixture may be further processed into shapes as by extrusion or molding. The process is particularly useful in the preparation of filled rubber and plastic formulations and in the preparation of inorganic composites.

Hence, it is an object of this invention to provide a process for the preparation of homogeneous mixtures of finely divided solid materials.

It is a specific object of this invention to break up aggregates or agglomerates of finely divided materials to obtain essentially a mono-disperse particle mix and to thereafter stabilize that mixture for further processing.

Yet another object of this invention is to obtain uniform mixtures of heat and shear sensitive particulate materials without incurring degredation or decomposition of those materials.

BRIEF DESCRIPTION OF THE DRAWING

Certain exemplary embodiments of the invention are illustrated in the drawing in which.

DESCRIPTION AND DISCUSSION OF THE INVENTION

Figure 1:
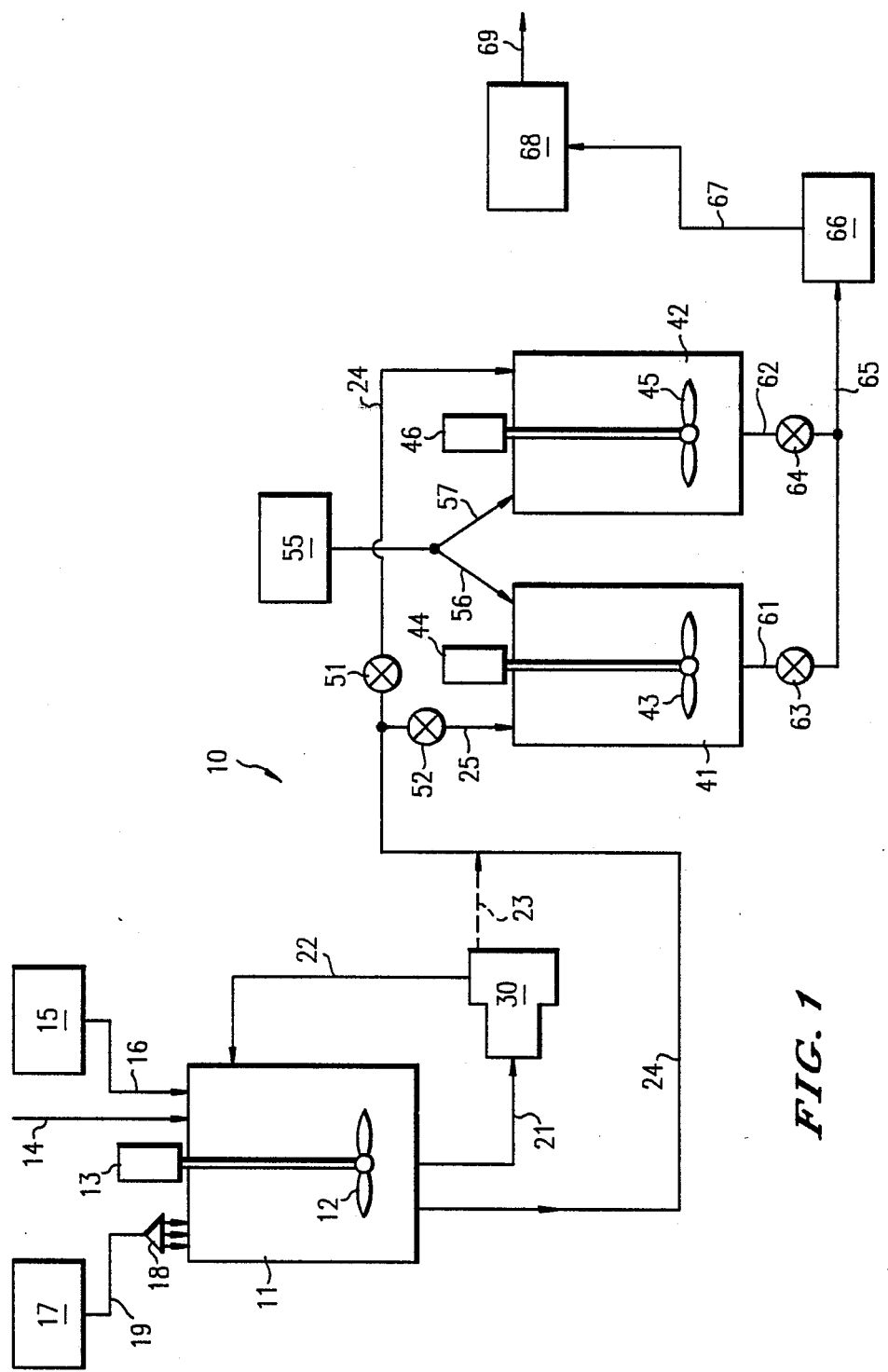
FIG. 1 is a diagrammatic flowsheet of one embodiment of the invention illustrating a batch-to-continuous process especially adapted for the preparation of filled plastics, the compounding of rubber and similar uses.

This invention includes a process for preparing homogeneous and essentially mono-disperse mixtures of finely divided and agglomerated solids and thereafter stabilizing those mixtures for further processing. Specifically, finely divided and agglomerated solids such as carbon black, fillers, pigments, salts, catalytic agents and the like are dispersed uniformly with other particulate materials such as rubbers or other polymers to form a homogeneous mixture. The mixture is then stabilized in a fashion which preserves its homogeneity after which the mixture can be formed into a desired shape by extrusion, casting, molding, pressing, or similar techniques.

Various embodiments of this invention will be described and discussed in detail with reference to the drawing figures. In all instances, the discussion will center around a process for preparing filled polymer or rubber compositions, it being understood that the techniques and processes described are generally applicable to many other systems including, for example, ceramic compositions and the like.

Referring first to FIG. 1, there is shown generally at 10 a batch-to-continuous system for producing the homogeneous mixtures of this invention. There is provided a slurry tank 11 which is used to prepare individual batches of the desired mixture. Tank 11 is equipped with a mixing means which may conveniently comprise propeller blade 12 rotated by motor 13. Liquid nitrogen is supplied to tank 11 by way of conduit 14 for use in preparing a slurry of the mixture components.

Components making up the mixture are ordinarily solid at ambient temperatures but may be liquids as well. There is provided at 15 a solids feed supply means which are adapted to supply known quantities of one or more different particulate solids according to the desired composition, or recipe, for the batch. Feed means 15 may conveniently comprise one or more weigh hoppers discharging into tank 14 by way of transfer means 16. Materials which are liquids at ordinary temperatures, such as certain plasticizers, prepolymers and the like, may be used in the process in addition to those materials which are normally solid at ambient temperature. In this case, there is provided liquid feed means 17 which may conveniently comprise one or more metering tanks adapted to dispense a known quantity of material in accordance with the requirements of the batch. It is usually appropriate to introduce liquids into tank 11 after charging it with liquid nitrogen. The liquid component introduction may be conveniently accomplished by forming the liquid into droplets as by passing it through nozzle 18 which communicates with feed means 17 by way of conduit 19. Droplets formed in the nozzle 18 preferably are of relatively small size, on the order of 1 mm or less in diameter, so that they freeze very quickly upon falling into the liquid nitrogen contained in tank 11. The frozen liquid droplets then behave in the same fashion as do the normally solid particulate materials. Another method for preparing frozen liquid particles is to inject a stream of the liquid component into the liquid nitrogen in tank 11 allowing the mixer 12 to break the frozen stream into particles on the order of 3 mm or less in size.

A single batch may be made up of as few as two or as many as ten or more different particulate materials, each material being added in a predetermined amount or ratio so that the overall composition may be held the same batch to batch. In the case of a compounded rubber, for example, the batch may include a natural or synthetic rubber, one or more vulcanizing agents such as sulfur, activators such as zinc oxide and stearic acid, reinforcing fillers such as carbon black, loading pigments and fillers including whiting, clays and the like, accelerators, antioxidants, antiozonants, extenders, softeners and other special purpose additives. All of these materials must be added to tank 11 in a particulate form with the individual particles preferably not exceeding a few millimeters in diameter. The ratio of particulate solids to liquid nitrogen in tank 11 and the intensity of the mixing action produced by mixer 12 are adjusted to maintain the particulate materials dispersed as a non-settling slurry.

Figure 3:
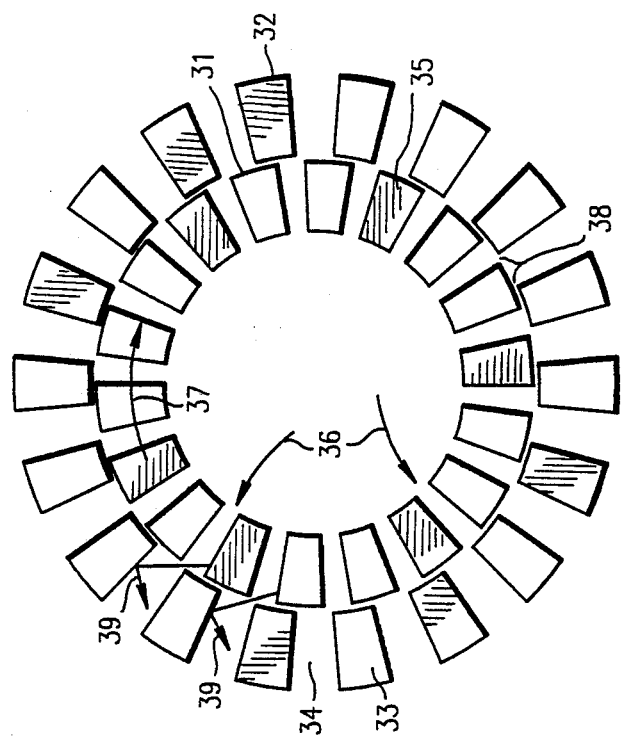
FIG. 3 shows the slurry flow and particle impingement pattern obtained through use of the device of FIG. 2.
Figure 2:
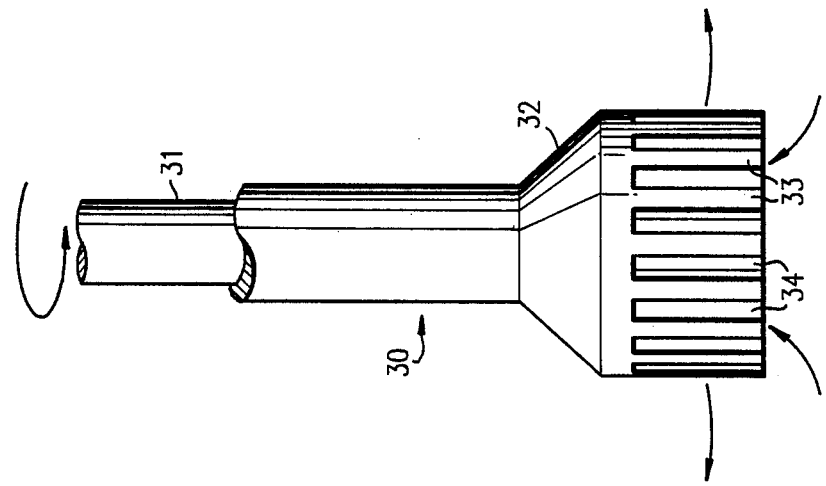
FIG. 2 illustrates a rotor-stator disperser suitable for use in preparing homogeneous mixtures of particulate materials according to the teachings of this invention.

After all of the components making up a batch have been added to tank 11 and have been mixed to form a slurry, a stream 21 is drawn from tank 11 and is passed through disperser-comminutor means 30. Means 30 comprises a device adapted to subject the particulate slurry to agitation and shear of sufficient intensity and duration to break up agglomerates and to reduce the size of the other particulates to a finely divided state. FIGS. 2 and 3 illustrate a disperser-comminutor which is well suited for this use. FIG. 3 is a view of the bottom of the rotor-stator assembly of FIG. 2. Referring to those Figures, means 30 preferably comprise a rotor 31 turning at high speed within a stator 32. The rotor and stator each comprise a cylinder having an open bottom. As is best shown in FIG. 2, the lower cylindrical portion of stator 32 includes a plurality of axially aligned parallel bars 33 which are separated by a like number of slots 34 extending through the cylinder wall. The rotor, shown in bottom view in FIG. 3, comprises a slotted cylinder fitting within the stator and having a plurality of axially aligned parallel bars 35 separated by a like number of slots 36. Rotation of the rotor is in the direction shown by arrow 37. The rotor and stator are dimensioned such that there is a small shearing gap 38 between the outside of the rotor and the inside of the stator. While the description of the disperser-comminutor means 30 has been in terms of a rotor and stator pair, the same result may be achieved using a pair of rotors turning in opposite direction. A two-rotor configuration is, however, more mechanically complex and offers little if any operating advantage over the rotor-stator arrangement.

The liquid nitrogen-particulate material slurry is directed into the bottom interior of the rapidly spinning rotor and is then forced radially through the slots of the rotor-stator. Because of the high rotational speed of the rotor, the slurry is accelerated greatly in its passage through the slots of the rotor. Appropriate rotational speeds of the rotor may be such as to produce a circumferential rotor velocity ranging from about 5 to about 25 meters per second. In most cases, a circumferential rotor velocity of about 10 to 20 meters per second is preferred. Particles and agglomerates in the slurry are then subjected to very large shearing and impact forces as they pass through shearing gap 38 colliding with surfaces of stator bars 33 in a pattern shown by arrows 39. Shearing gap 38 also constitutes an area of very great turbulence which contributes to the uniform mixing of the particles contained in the slurry. Dispersing devices of the type described are manufactured by Janke & Kunkel GMBH & Co. of West Germany.

Returning now to a consideration of FIG. 1, a comminuted and dispersed particulate mixture produced by passage of the slurry stream through means 30 may be returned to tank 11 by way of line 22 and that process continued until the agglomerates and particulates contained in the slurry have been broken up to form an essentially mono-disperse and homogeneous suspension. Alternatively, the dispersed particulate suspension exiting means 30 may be directed through line 23 for further processing in a manner which will later be described.

Figure 4:
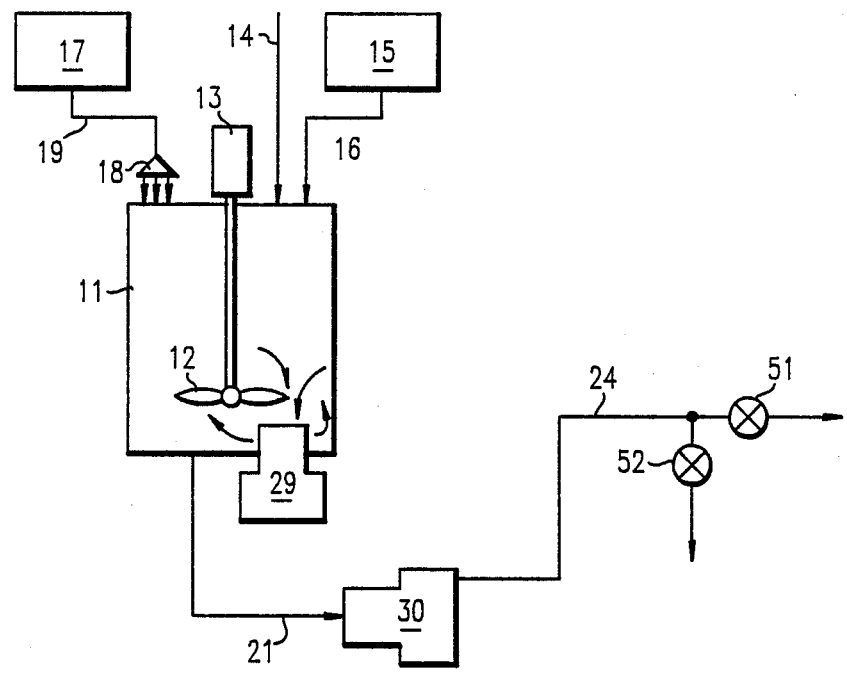
FIG. 4 depicts an alternative embodiment of a portion of the flowsheet of FIG. 1.

Another arrangement of slurry tank 11 is illustrated in FIG. 4. In this arrangement, there is provided a bottom mounted disperser-comminutor means 29 which is similar in operation to means 30. Operation of the disperser means 29 causes slurry to flow through the means in the general pattern shown by the arrows to break up agglomerates and reduce the size of particles. Ordinarily, the rotor-stator configuration and the rotor speed of means 29 will be selected to produce a coarser grind than is obtained by means 30 to thereby form the desired feed stock for single pass operation of means 30.

After the batch contained in tank 11 has been formed into a homogeneous particulate suspension by action of either means 30 or means 29 or both, the total batch is then discharged from tank 11 through line 24 into holding means which suitably may comprise one or the other of holding tanks 41 or 42. Tank 41 is equipped with stirring means 43 powered by motor 44. Similarly, tank 42 is equipped with stirring means 45 powered by motor 46. The stirring means of both tanks 41 and 42 are adapted to provide a gentle agitation sufficient to keep the particulates in suspension.

As shown in the drawing, line 24 is directed through valve 51 for discharge into tank 42. There is also provided branch line 25 which communicates between line 24 and tank 41 through valve 52. Thus, the particulate suspension batch from tank 11 may be directed at will either to tank 41 or to tank 42 by the proper positioning of valves 51 and 52. Another particulate solids feeding means 55 may be provided to introduce a measured quantity of a selected material into either tank 41 or 42 by way of entry means 56 and 57 respectively. In certain instances it is desirable to introduce physically fragile materials, such as brittle reinforcing fibers or whiskers, into the particulate suspension before processing the mixture into its final form. Brittle fibers and other fragile materials can be physically degraded by the high shear and impact produced by passage through dispersing means 30. Introduction of fragile materials into the particulate suspension in the holding tanks downstream of the dispersing means 30 avoids physical degredation of such materials.

A discharge conduit 61 is provided at the bottom of holding tank 41 and tank 42 is similarly equipped with a discharge conduit 62. Flow of material through conduits 61 and 62 is controlled by valve means 63 and 64 respectively. Both of discharge conduits 61 and 62 lead into stabilizing means 66 by way of line 65. Stabilizing means 66 comprises a system for producing a transition from a homogeneous suspension of particulates in liquid nitrogen to a powder and requires that the liquid nitrogen be removed. Liquid nitrogen removal may be accomplished in two basic ways; by a liquid-solids separation as by filtration, or by vaporization of liquid nitrogen by introduction of heat into the system. The latter approach is generally preferred and can be readily accomplished through use of a screw-type conveyor having heat transfer capability. Removal of sufficient liquid nitrogen from the suspension to preclude free flow results in a stabilized paste or powder which will not segregate upon further handling Thus the homogeneity of the liquid suspension is preserved.

The stabilized powder may then be passed by way of conveying means 67 to final processing means 68. Processing means 68 may comprise any conventional forming or shaping means adapted to operate with a powder feed as, for example, means for extruding, casting, molding or pressing the powder to produce a final product 69. In many instances, the processing occurring in means 68 will include a chemical reaction among and between one or more of the materials making up the composition. Such chemical reactions may include vulcanization, polymerization, cross-linking, and the like.

The provision of multiple holding tanks 41 and 42 allows the homogeneous suspension of dispersed particulate materials to be fed to stabilizing means 66, and thence to processing means 68, on a continuous basis. First one and then the other of the holding tanks may be used as a feed source to means 66 by proper positioning of valves 63 and 64. While one holding tank, tank 41 for example, is feeding means 66, tank 42 is available to accept a newly prepared batch from tank 11. By judicious selection of batch sizes and processing rates, tank 42 will be filled and available as a feed source to means 66 when the contents of tank 41 is depleted thus providing a constant supply of homogeneous particulate suspension for stabilizing means 66.

As was set out earlier, the dispersed particulate suspension exiting from means 30 may be directed through line 23 to line 24 and thence to either of holding tanks 41 or 42. Because of the intense energy level in shearing gap 38, on the order of 1,000 times the level obtainable by ordinary stirring techniques, many of the agglomerates and particulates in the slurries of this invention may be dispersed and adequately comminuted in a single pass through means 30. In those instances, repeated passes through means 30 results only in rather insignificant increases in particle fineness and degree of dispersion but has the disadvantage of adding significant amounts of heat to the system through the shear energy expended.

Procedures must be modified somewhat when operating in a once-through mode, in which means 30 exits to line 23, as compared to the use of a supplemental disperser means 29 or the recirculating mode previously described. As before, a batch of particulate materials is made up in tank 11 and is maintained in suspension as a slurry in liquid nitrogen by action of stirring means 12. The batch is then continuously fed by way of line 21 to means 30 to produce a homogeneous, dispersed particulate suspension. That suspension is routed to either tank 41 or 42. Tanks 41 and 42 then alternate as a feed source to stabilizing means 66 as was previously described. After the batch has been processed through disperser means 30, means 30 is shut down while a new slurried batch, conforming in composition to the previous one, is prepared in tank 11. The cycle is then repeated with the output from means 30 being directed to the other of the holding tanks 41 or 42.

The following example will serve to further illustrate but not to limit the scope of the invention.

EXAMPLE

Multiple batches of a rubber formulation were prepared by slurrying the components of the formulation in liquid nitrogen. Each batch conformed in composition to the recipe set out in the following table.

TABLE

| Component | Weight % |
|---|---|
| Natural rubber | 62.5 |
| Carbon black | 28.1 |
| Sulfur | 1.6 |
| Zinc oxide | 2.5 |
| Stearic acid | 0.6 |
| Accelerators, antioxidants, and other additives | 4.7 |

Batches of convenient size were made up by weighing out the components according to the above recipe. The rubber was cut into cubes about 2 mm on a side and all of the other materials in the recipe were in the form of agglomerated powders. After slurrying a batch in liquid nitrogen, it was passed through a disperser of the type described in relation to FIGS. 2 and 3 to form a homogeneous suspension. As a result of that processing, the rubber was comminuted into very fine particles and the particle agglomerates of the other components were broken up and thoroughly dispersed. After dispersion was complete, the batches were stabilized by evaporation of liquid nitrogen to form a free flowing powder. The stabilized batches were then mixed together by tumbling in a double cone mixer.

The stabilized and mixed powder was then compounded by extrusion through a 50 mm by 10 mm strand die using a Berstorff ZE 40-A twin screw lab extruder. The screws used had an L/D ratio of 23 and an overall length of 1350 mm. In a first run, the extruder was arranged with the rubber powder feed at about the midpoint of the screws, between 650 and 700 mm from the base. A kneading block element was located at about the 900 mm point, a vacuum vent between 1050 and 1100 mm, and a gear mixer at the 1250 mm point. The extruder was operated at 85 rpm at a feed rate of 25 lb/hr. It was found that the product was still a powder in the vent section but started to flux in the gear mixer near the screw tip. The melt temperature was 120° C. and the extrudate was porous and rough.

The screw was then rearranged with the positions of the kneading block and gear mixer reversed with both located between the feed point and the vacuum vent. A smooth tread was extruded at 54 rpm and a 30 lb/hr feed rate. However, the extruded tread did show some internal porosity which was not removed by operation of the vacuum vent. Melt temperature was about 112° C.

In a last test run on this powder sample, the kneading block was removed from the extruder screw leaving only the gear mixer to work the rubber powder. A fully homogeneous tread was extruded at 35 rpm and a 30 lb/hr feed rate. The melt temperature was 105° C.

The tests showed that rubber powder prepared in accordance with this invention can be compounded by extrusion at low temperatures using a minimum of shear elements and short barrel length at very low screw speeds. All of these factors, low temperature, minimum shear, low screw speeds and short travel through the extruder barrel minimize degradation of the rubber and produce a product of a quality not obtained using conventional compounding techniques.

The above example was set out to illustrate a specific embodiment of the invention and is not to be construed as limiting the scope of the inventive process.

We claim:

1. A method for preparing a homogeneous mixture of finely divided particles of at least two unlike materials, at least one of said materials including fine particle agglomerates, comprising:
   forming a slurry of said particulate unlike materials in liquid nitrogen;
   subjecting said slurry to agitation and shear forces to break up agglomerates and to maintain individual particles of said materials in a randomly mixed, homogeneous suspension; and stabilizing said homogeneous suspension by removing liquid nitrogen therefrom while maintaining the homogeneity of said suspension.

2. The method of claim 1 wherein said agitation and shear forces acting on said slurry are produced by passing said slurry through a disperser-comminutor comprising a rotor turning at high speed within a stator.

3. The method of claim 2 wherein said rotor and stator each comprise an open ended cylinder having an outer surface and an inner surface and a slotted wall.

4. The method of claim 3 wherein said rotor and stator are dimensioned such that there is a small shearing gap between the outside surface of the rotor and the inside surface of the stator.

5. The method of claim 2 wherein the rotational speed of said rotor is such as to produce a circumferential velocity from about 5 to 25 meters per second.

6. The method of claim wherein said mixture includes at -least one polymer.

7. The method of claim 6 wherein said polymer is a rubber and wherein said mixture includes carbon black.

8. The method of claim 1 wherein said mixture comprises a polymer and a salt.

9. The method of claim 1 wherein said mixture includes a ceramic.

10. The method of claim 1 wherein said mixture includes a material which is normally liquid, said liquid freezing and forming solid particulates in said liquid nitrogen.

11. The method of claim 1 wherein liquid nitrogen is removed from said homogeneous suspension by vaporization.

12. A batch-to-continuous process for compounding mixtures of unlike particulate materials comprising:
preparing a batch of said unlike materials by mixing a predetermined quantity of each of said materials together and suspending said materials as a slurry in liquid nitrogen to form a slurry batch;
subjecting said slurry batch to agitation and shear forces to break up agglomerates and to maintain individual particles of said materials in a randomly mixed, homogeneous suspension;
transferring said homogenized slurry batch to a holding means, said holding means arranged to maintain the homogeneity of said suspension and to prevent settling of particulates;
continuously withdrawing a slurry stream from said holding means and stabilizing said withdrawn slurry stream by removing liquid nitrogen therefrom to form a powder;
preparing a second slurry batch having the same composition as said first slurry batch and subjecting said second batch to agitation and shear forces to break up agglomerates and to maintain individual particles of said materials in a randomly mixed, homogeneous suspension to obtain a second homogenized slurry batch;
transferring said second homogenized slurry batch to said holding means at a time before said first slurry batch has been exhausted by withdrawal of said slurry stream therefrom, and
continuing the preparation of slurry batches at a rate sufficient to provide a continuous slurry stream for stabilization by removal of liquid nitrogen therefrom to form a powder.

13. The method of claim 12 wherein said agitation and shear forces acting on said slurry are produced by passing said slurry through a disperser-comminutor comprising a rotor turning at high speed within a stator.

14. The method of claim 13 wherein said rotor and stator each comprise an open ended cylinder having an outside surface and an inside surface and a slotted wall, said rotor and stator dimensioned such that there is a small shearing gap between the outside of the rotor and the inside of the stator.

15. The method of claim 14 wherein the rotational speed of said rotor is such as to produce a circumferential velocity from about 5 to 25 meters per second.

16. The method of claim 12 wherein said unlike materials comprise a rubber and carbon black.

17. The method of claim 12 wherein said unlike materials comprise a polymer and a salt.

18. The method of claim 12 wherein said unlike materials include at least one material which is normally liquid and which freezes to form solid particulates in liquid nitrogen.

19. The method of claim 12 wherein said holding means comprise a plurality of holding tanks, each of said holding tanks sized to hold a slurry batch.

20. The method of claim 19 wherein each of said holding tanks is adapted to provide agitation sufficient to maintain said slurry in suspension.

21. The method of claim 20 wherein a measured quantity of a particulate solid is introduced into each said slurry batch in said holding tanks.

22. The method of claim 21 wherein said particulate solid is a physically fragile material.

23. The method of claim 22 wherein said fragile material comprises a fiber.

24. The method of claim 12 wherein liquid nitrogen is removed from said slurry stream by vaporization.

25. The method of claim 24 wherein said vaporization is accomplished in a conveyor having heat transfer capability.

26. The method of claim 12 wherein said stabilized powder is subjected to further processing to form a shaped article.

27. The method of claim 26 wherein said further processing comprises extrusion.

* * * * *